March 25, 1930.  J. SCHAEFFER  1,751,951
GRAIN DRILL
Filed July 22, 1921  5 Sheets-Sheet 5
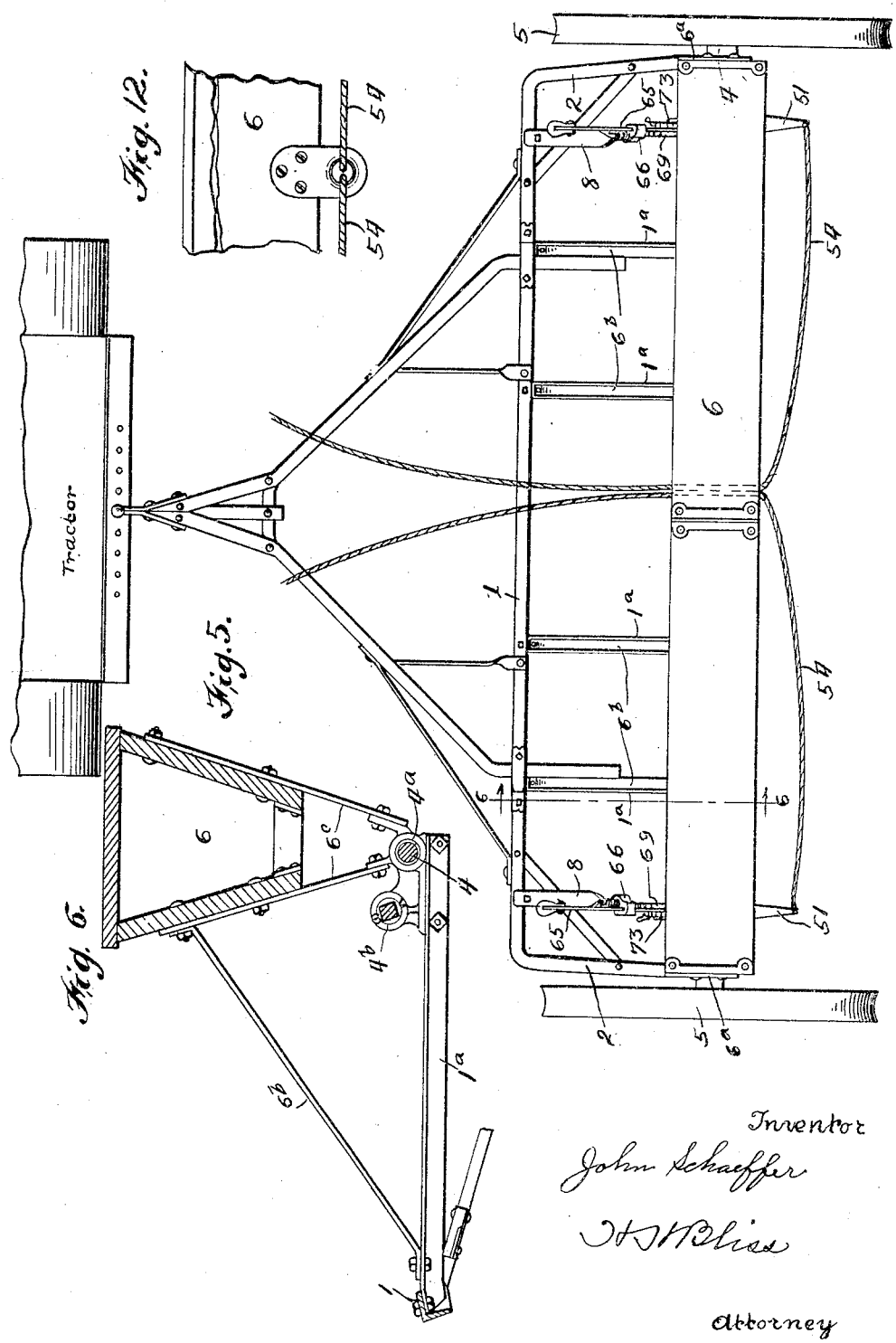

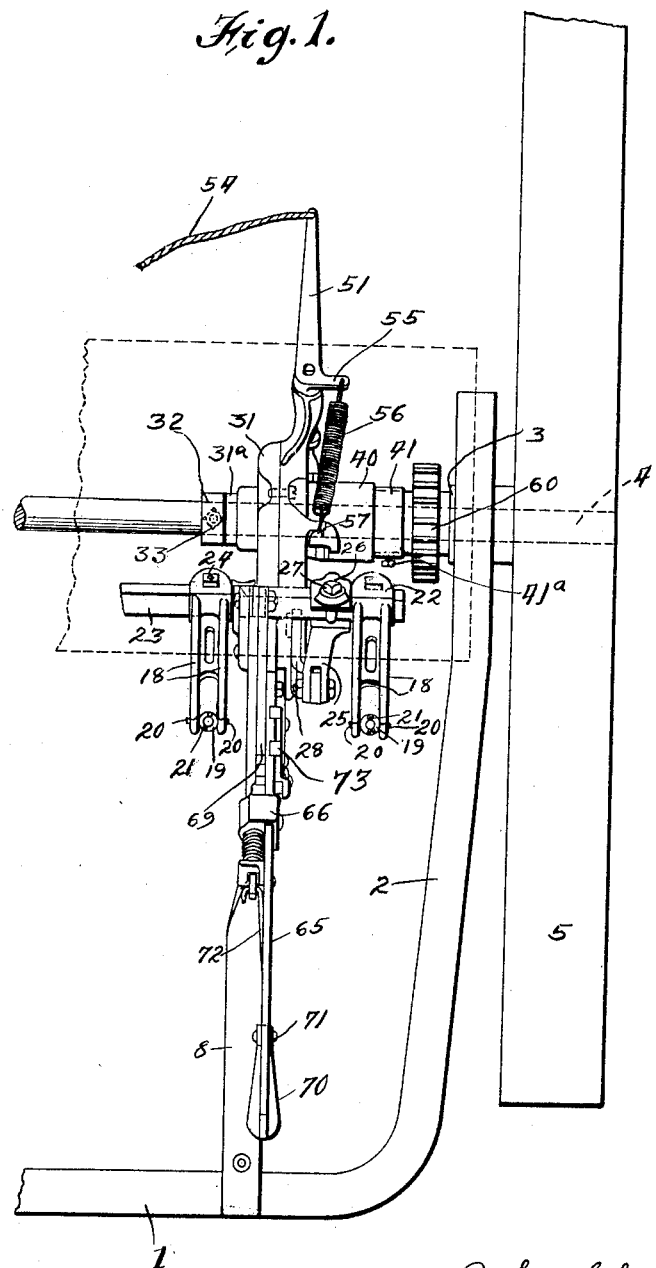

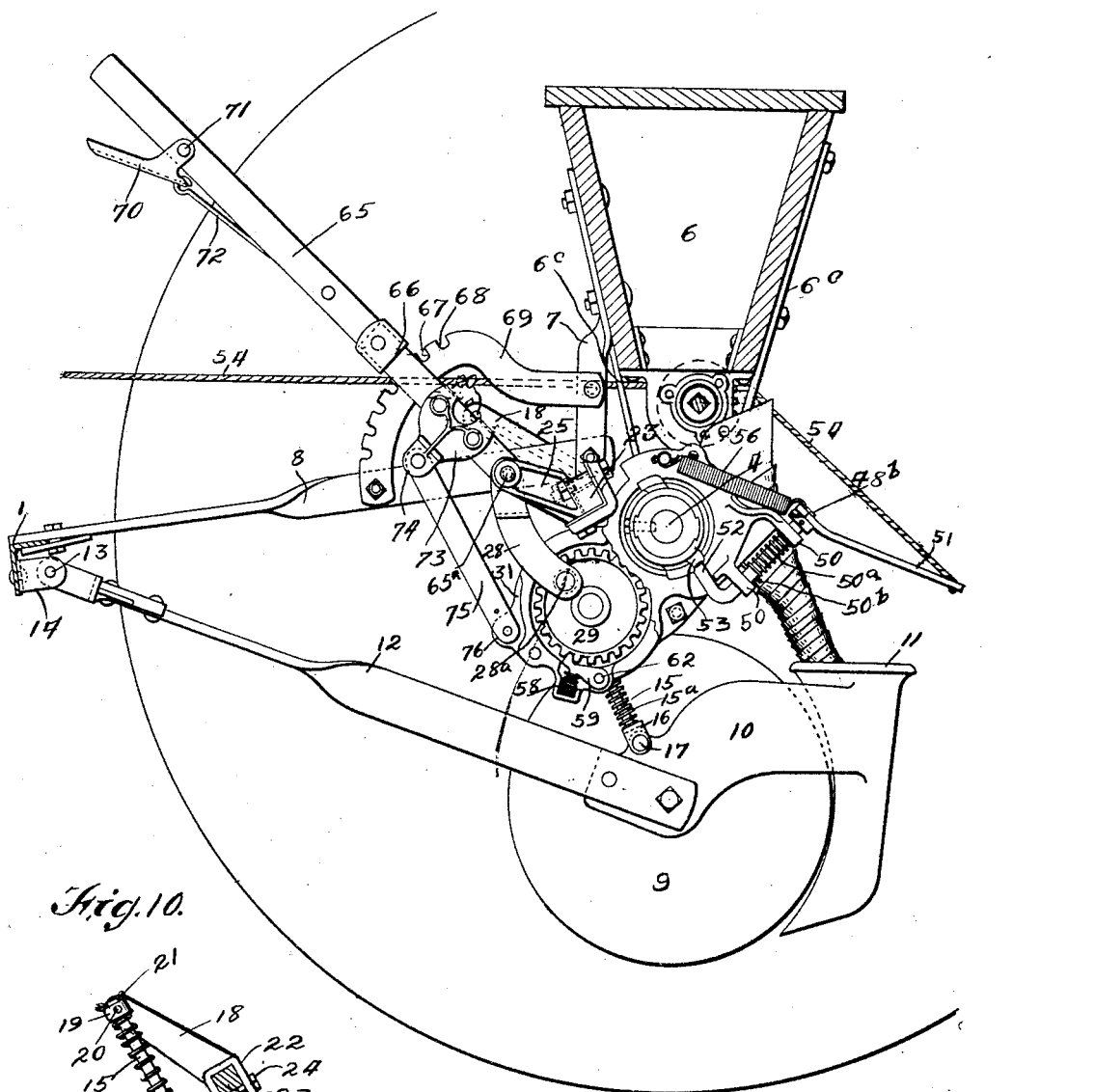

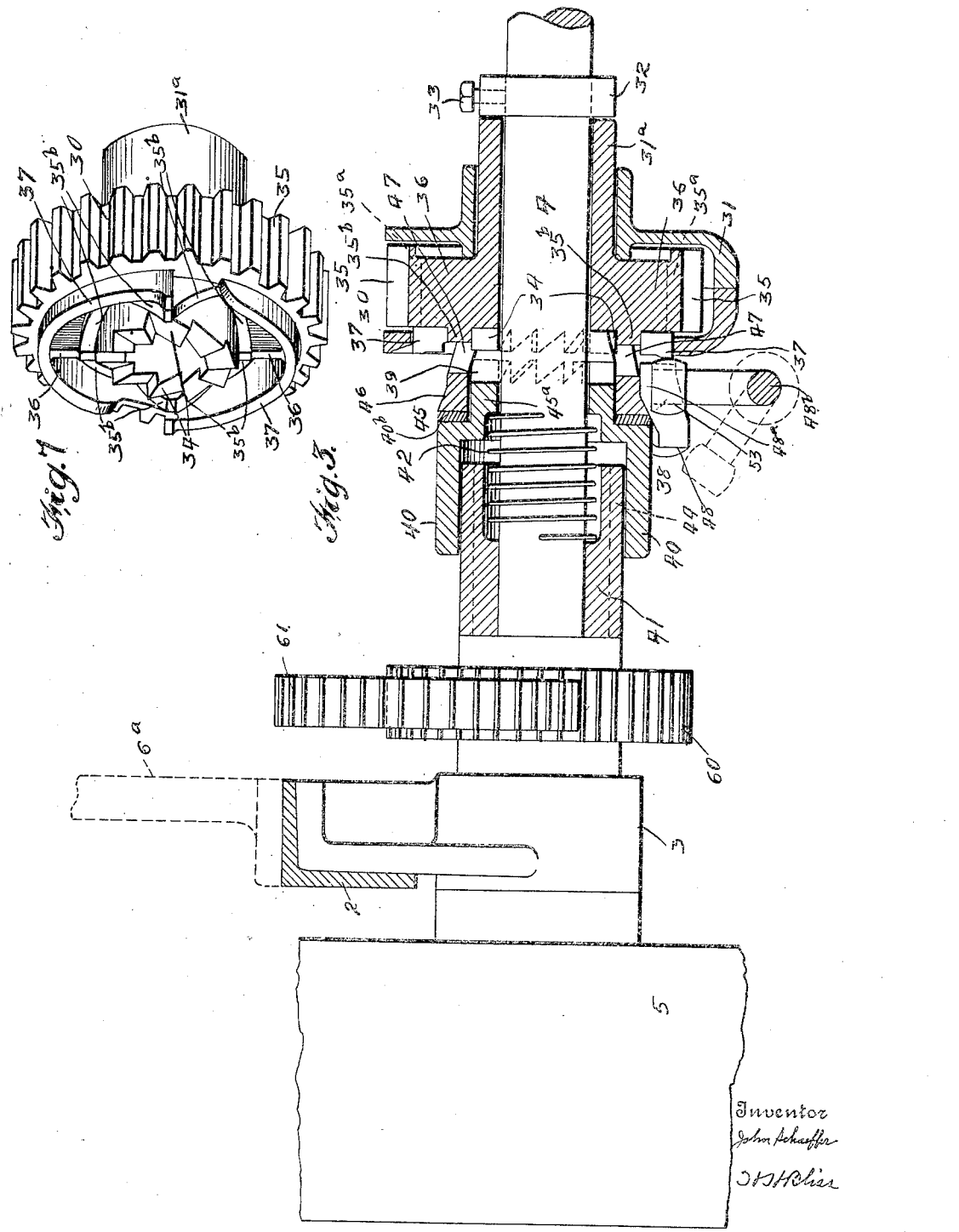

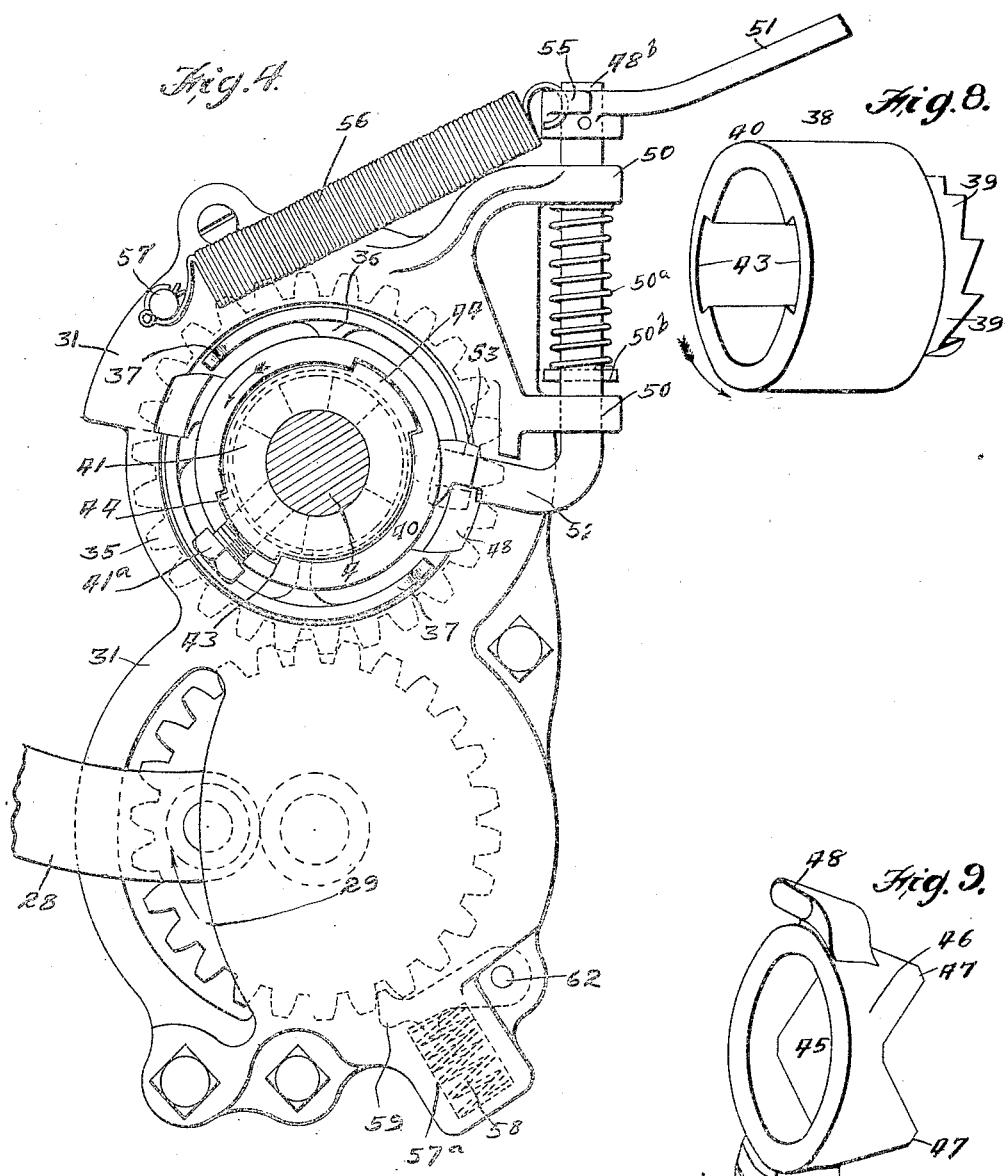

Patented Mar. 25, 1930

1,751,951

UNITED STATES PATENT OFFICE

JOHN SCHAEFFER, OF HORICON, WISCONSIN, ASSIGNOR TO THE VAN BRUNT MANUFACTURING COMPANY, OF HORICON, WISCONSIN, A CORPORATION OF WISCONSIN

GRAIN DRILL

Application filed July 22, 1921. Serial No. 486,751.

This invention relates to improvements in grain drills, and particularly to mechanism combined with the main framework and with the furrow opening and seed delivering mechanism by which the parts contacting with the ground can while operating be adjusted as desired or can be lowered or lifted at option.

Fig. 1 is a top plan view of a part of a grain drill machine sufficient to illustrate the manner of applying my improved adjusting and lifting mechanism thereto.

Fig. 2 is an elevation showing the parts indicated in Fig. 1.

Fig. 3 is a view, partly in plan and partly in section, of the devices by which power is taken from the main axle for lifting and lowering the drag bars and attachments.

Fig. 4 is a view showing the gear elements of the lifting mechanism, and the means for throwing them into and out of action.

Fig. 5 is a plan view of a grain drill embodying my improvements.

Fig. 6 is a vertical section on line 6—6 of Fig. 5.

Figs. 7, 8, 9, 10, 11 and 12 show detail parts.

The framework of the mechanism comprises the front horizontal cross bar 1, curved backward at its ends to form the side bars 2. At 3, 3 are mounted bearings secured to the side bar 2 which rotatably support transverse axle shafts 4 which have secured to their outer ends the ground wheels 5. The inner ends of the axle shafts 4 are supported in bearings $4^a$, the latter being connected with the cross bar 1 by forwardly extending, horizontally positioned angle bars $1^a$. Each wheel 5 is secured rigidly to its shaft to insure continuous rotation thereof while the mechanism is traveling over the ground and as each wheel and its shaft are rotatable independently of the other a differential action will occur between the two when the machine is turned.

The seed box 6, which may be of any suitable construction at its ends is mounted upon upright standards $6^a$, $6^a$ (see Figure 3) which are bolted thereto, and which at their lower ends are connected to the rear portions of the side bars 2. Intermediate its ends, the seed box is connected with the axle and frame by upright straps $6^c$—$6^c$ secured to the front and rear sides of the box and to the bearings $4^a$. Brace bars $6^b$ extend from the front of the box to the cross bar 1, and the seed box is further braced by standards 7—7 secured to the front of the box and at their lower ends connected to forwardly extending longitudinal bars 8, the latter also forming the supports for furrow opener adjusting means hereinafter described.

Each shaft 4 carries a gear wheel 60 rigidly secured thereto which drives a second gear 61. By means of suitable mechanism, not shown, the seed delivering mechanisms in the box 6 are actuated from the gears 61.

Each drill unit comprises the furrow opener 9 secured to a bracket 10, the latter carrying at its rear end the boot 11. Rigidly secured to the bracket 10 is a forward and upward inclined drag bar 12 which is hinged at 13 to a bracket 14 bolted to the frame bar 1.

A rod 15 extends upward from the bracket 10 and is hinged to the latter by the fork 16 and pin 17. At its upper end the rod 15 is pivotally secured to longitudinally extending parallel arms 18 by means of a collar 19 formed with trunnion pins 20 mounted in the end portions of the bars 18. To prevent downward displacement of the rod 15 through the collar 19, a cotter 21 is employed.

The rod 15 carries a compression spring $15^a$ abutting at its lower end against the upper edge of the fork 16, and at its upper end against the collar 19, fastened to the arms 18.

At their rearward ends the arms 18 are rigidly secured or preferably formed integral with a sleeve 22 which is provided with a square aperture to receive the square shaft 23 and to be locked thereon with a bolt 24.

The shaft 23 is journaled in bearings $4^b$ supported by the bars $1^a$ and extends transversely of the machine and parallel to the main shaft 4. The shaft 23 is divided centrally of the machine so that either section of the shaft and the furrow opener units connected therewith can be adjusted independently of the other. It will be understood that as many sets as are desired of the furrow opener devices just described can be connected to the shaft 23 and that various modifications in such devices may be made, those shown herein being intended to illustrate one method of connecting a furrow opener and a boot-carrying device to the sleeve element 22 and to the shaft 23.

I will now describe the method of raising and lowering the furrow openers and boots. As the mechanism at each side of the machine is similar the description of the parts at one side will suffice. An arm 25 is securely clamped at 26 by means of the bolt 27 to the square shaft 23 so that any swinging movement imparted to said arm will rock the shaft 23.

To the forward end of the arm 25 is pivotally connected the arcuate link 28 pivoted at its lower end to a pinion 29, which constitutes one element of certain intermediate mechanism by which power is applied to raise or lower the drill units, as hereinafter described.

The pinion 29 engages with a spur gear 30 rotatably mounted on the main drive shaft 4 and is driven therefrom, at option, by clutch mechanism to be described. The gear 30 constitutes an optionally actuated secondary power transmitter, and said gear and the pinion 29, as well as the clutch mechanism, are enclosed in a casing 31 which carries adjustably the pinion 29 and its attachments, this casing also protecting the moving parts from dirt, grit, and the like, there being a slot in the upper portion of the casing through which the link 28 extends to permit its free movement as it oscillates with the rotation of the pinion 29. The link 28, arm 25 and shaft 23 constitute other parts of the intermediate mechanism that operatively connects the secondary power transmitter 30 with the drill units, and it will be evident that by rotation of the pinion 29 the arm 25 will be actuated through the link 28 to rock the shaft 23, thereby raising or lowering such units.

The spur gear 30, as shown in Fig. 3 is provided with a sleeve part 31ª adapted to surround the shaft 4, and to abut at one end against a collar 32 which is tightly fastened by the set-screw 33 upon said shaft. At the other end of the sleeve part of the gear are formed ratchet teeth 34, 34. The outer portion of the gear wheel 30 carrying the peripheral teeth 35, 35 is connected with the sleeve 31ª by a spider comprising the weblike parts 36, 36.

On the inner surfaces of the peripheral part 35ª are formed two axially extending cam surfaces 35ᵇ, 35ᵇ.

The gear is provided with flange portions 37, 37 each extending partway around one-half of the periphery at the base of the teeth, but so positioned relatively to each other as to leave two equal gaps between their ends diametrically opposite to each other.

Adjacent the spur gear 30 on the shaft 4 is mounted a second clutch element 38 which is formed with ratchet teeth 39 adapted to engage, when desired, with the ratchet teeth 34 of the sleeve element of the gear.

The clutch element 38 has a sleeve-like portion 40 at its end opposite to the end carrying the ratchet teeth 39, and this sleeve is adapted to receive a spring 42, one end of which abuts against the inner end of the sleeve-like part 40 and the other end of which abuts against a similar sleeve-like portion of an elongated collar 41 secured to the shaft 4.

The sleeve 40 is provided with keyways 43, 43 adapted to slidably receive keys 44 on the collar 41. Thus the sleeve 40 is constantly driven by the shaft 4, and constitutes a primary power transmitter by which the secondary power transmitter 30 may be optionally actuated.

It will be seen that under the force of the spring 42 the clutch elements would be constantly in engagement and, therefore, a clutch spreader 45 is mounted on a flange 40ª on the sleeve 40 and between the clutch elements 34 and 39 to hold them out of engagement with each other when desired. A washer 40ᵇ is mounted on the flange 40ª between the spreader 45 and the shoulder of the sleeve 40 to lessen the friction between the parts.

The spreader 45 comprises the cylindrical portion 46 having the axially extending lugs 47, 47, and the radially projecting cam lugs 48, 48. The latter are positioned diametrically opposite to each other on the outer surface of the spreader and the cam surfaces are formed to compel longitudinal movement of the spreader on its bearing 40ª. These lugs are also formed with the faces 48ª slightly inclined to the central longitudinal axis of the spreader and act as abutment faces during the operation of the mechanism.

The axially extending lugs 47, 47, are adapted to enter the spaces between the flanges 37 and the teeth 34 of the driven clutch element during the time when the two clutch elements are engaged and the gear wheels 30 and 29 are being driven by the shaft.

During this time the clutch spreader 45 is also rotating. If the spreader 45 is stopped from rotating the axially extending lugs 47 of the spreader will engage with the cam surfaces 35ᵇ and tend to push the spreader longitudinally away from the driven element. As it is moving longitudinally it carries with it the clutch element 40 to such a distance that the rigid teeth of the two clutch elements are disengaged, and until the spreader is again permitted to rotate the disengagement will continue.

To control the rotation of the spreader a roller 53 on the curved end portion 52 of a shaft 48ᵇ is positioned to abut against the surface 48ᵃ of the spreader in its normal position. When it is desired to release the spreader for rotation, the shaft 48ᵇ can be rotated in its bearings 50, formed integral with the gear casing 31, by means of a lever 51 secured to the upper end of the shaft 48ᵇ and actuated by a cable 54 extending to a point where it is accessible to the operator while in his seat. A spring 56 causes the roller 53 to return to its normal position as soon as the tension on the cable 54 is released. The spring 56 is fastened at one end to a lug 57 extending outward from the casing 31 and at its other end to a short arm 55 formed integral with the lever 51 and extending laterally. Mounted on the shaft 48ᵇ between the bearings 50 is a coil spring 50ᵃ, one end of which abuts against the upper bearing 50 the other end against a pin 50ᵇ secured to the shaft. When the surface 48ᵃ of the spreader 45 engages the roller 53, the shaft 48ᵇ is shifted longitudinally through the bearings 50 against the resistance of the spring 50ᵃ thus cushioning the parts and also storing power in the spring 50ᵃ which acts to force the shaft and roller back and impart slight additional movement to the spreader 45 and collar 40 to insure clearance between the ratchet teeth 34—39. While the roller 53 is in contact with the surface 48ᵃ of the spreader, the power of the spring 50ᵃ overcomes the power of spring 42 and holds the clutch open. The spring 50ᵃ also yields slightly when the shaft 48ᵇ is rocked to swing the roller 53 off of the surface 48ᵃ to permit the clutch to close.

At 57ᵃ the casing 31 is recessed to receive a spring 58 and a dog 59, the latter being pivoted at 62 to the walls of the casing. The free end of the dog 59 is forced into engagement, successively, with the teeth of the pinion 29 as the latter rotates, by the pressure of the spring 58. But when the rotation of the pinion 29 has ceased the dog 59 prevents its backward rotation under the weight of the drill mechanisms.

The structure also includes manually operated means provided for adjusting the depth to which the furrow openers enter the ground, such manually operated means comprising the long lever 65 pivoted at its lower end at 65ᵃ on the bar 8 and provided with the latch 66 adapted to enter into the notches 67, 68 of the rack bar 69. This bar is bolted at one end to the standard 7 and at its other end to the longitudinal bar 8. A handle 70 pivoted at 71 on the lever 65 and arranged to actuate the rod 72, in a well known manner, serves to release the latch 66 from the notches 67, 68 when desired. A bracket 73 is rigidly secured to the lever 65 near its pivot point 65ᵃ and is formed with the ears 74, 74. A link 75 is hinged to the bracket 73 by a pin passing through apertures in the ears 74 and a corresponding aperture in the link, and at its lower end the link is pivotally secured between ears 76 on the gear casing 31.

It will be readily seen that by moving the lever 65 around its pivot point 65ᵃ the entire gear casing will be swung upward or downward around the shaft 4 as an axis. And as such movement occurs the fulcrum point for raising and lowering the drill mechanisms is correspondingly moved upward and downward.

The operation of the parts, when it is desired to lower the openers and the boots, will be readily understood. The operator gives a slight pull on the cord 54 which results in swinging lever 51 and rocking shaft 48ᵇ and roller 53. The latter moves from the full line position in Fig. 3 to the dotted line position. Thereupon the spring 42 causes the clutch teeth 39 to engage with those on the gear wheel 30, the spreader 45 shifting longitudinally, the lugs 47 entering the gaps in the flange 37—37, and the continuously rotating traction-driven axle or shaft 4, causes said gear wheel to commence to rotate. It, in turn, starts the gear wheel 29 to rotating in clockwise direction as seen in Fig. 2. The hinge 28ᵃ which connects the link 28 to wheel 29, rotates also clockwise from the position shown in Fig. 2 and while doing so lowers the drag-bars, the openers and the boots. This continues until the hinge pin at 28ᵃ makes a half revolution. During that half revolution the roller 53 has been held by the spring 56 against the edge of one of the flange sections 37 in position to intercept the surface 48ᵃ of the spreader, and near the termination of the half revolution of the spur gear 30, engages one of said surfaces and stops the spreader. Thereupon the completion of the half revolution causes the cam surfaces 35ᵇ to actuate against the cam lugs 47 (the surface 48ᵃ incidentally moving along the roller 53) shifting the spreader 45 and the clutch sleeve 40 outward and compressing the spring 50ᵃ, which results in disengaging the teeth 39 from those at 34.

That is to say the clutch which drives the gear 30 is disconnected from the power shaft or axle 4 at the time when the lower end of the thrust-link 28 reaches its lowermost position, this being the time when the openers and the seed boots have reached their working positions in the ground. The wheels 29 and 30 are prevented from moving when the clutch at 39, 34 is open, by the dog 59, which permits a clockwise movement of the wheel 29 but instantly locks it against reverse rotation.

When the openers and boots are to be elevated it is accomplished by imparting power to the wheel 29 through the next half revolution, this carrying the hinge at 28ᵃ up, again, to its uppermost position. The thrust-link 28 forces the crank-arm 25 upward and rocks the shaft 23, which, through the crank-like arms 18, lifts upward on the suspension rods or bars 15, and, through the latter, lifts the drag-bars and the parts attached to them.

To cause such a half rotation of the lifting wheel 29, the shaft 48$^b$ is again rocked by a pull on cord 54. Upon rocking of the shaft 48$^b$ the roller 53 is moved out of the path of the lug 48, thus permitting the spreader 45 to be rotated by contact of the washer 40$^b$ with the face of the clutch element 40. As the spreader rotates, the lugs 47 are moved past the cam surfaces 35$^b$ and enter the gaps in the flange 37—37, thus permitting spring 42 to move the clutch element 40 and the spreader 45 to the right (see Fig. 3), causing the ratchet teeth 34 and 39 to become engaged. When the cord 54 is released the spring 56 returns the shaft 48$^b$ to normal position with the roller 53 against the flange 37 and in the path of surface 48$^a$. When the half revolution of wheel 29 is completed the roller 53 has again stopped the spreader 45 and the cam surfaces 35$^b$ have acted upon the cam lugs 47 to shift the spreader and sleeve 40 to separate the clutch teeth, and the wheel 30 is locked against further revolution with the shaft 4. The lifting and lowering of the drill units is therefore accomplished by successive uni-directional half revolutions of the wheel 30.

By means of the lever 65 and its attachments the gear casing can be elevated or lowered as desired. It is at times desirable to force the openers to greater or less distances downward. This can be readily accomplished by utilizing the lever to vertically adjust the wheel 29, and, with it, the position of the thrust-link 28 and the suspension devices of the drag-bars. That is to say in moving the manually operated means or lever 65 downwardly the resultant downward movement of the gear casing or swinging supporting member 31 pulls downwardly through the crank pin 28$^a$ and link 28 to swing the arms 18 downwardly for the purpose of lowering the drill units, and, conversely, upward movement of the manually operated lever 65 transmits an upward thrust through the crank pin 28$^a$ and link 28 for the purpose of raising the drill units. It will thus be seen that all vertically adjusting movements of the lever 65 are transmitted to the drill units through the same intermediate mechanism which operatively connects the power lift clutch or power transmitter with the drill units, i. e. such movements of the manually operable lever 65 are operable through the crank pin 28$^a$, link 28, arms 25, shaft 23, arms 18 and rods 15 to raise and lower the drill units. Such adjusting operation of the lever 65 can be performed when the drill units are raised to transport position as shown in Figure 2 or when they are lowered into operative engagement with the ground. It will be noted that such actuation of the lever 65 either raises both the upper and lower limits of the path of movement of each drill unit or lowers such upper and lower limits. The latch 66 and notched rack bar 69 constitute means for holding the manually operable lever 65 in any desired adjustment, so that for a given soil condition or other operating condition the desired depth adjustment can be maintained without being disturbed by the repeated lifting and lowering of the drill units through the actuation of the power operated lifting mechanism. By virtue of having the above described operating parts disposed forwardly of the axle 4 and forwardly of the seed box 6 the depth adjusting lever 65 can be extended from the front of the implement where it may be actuated by the operator on the tractor for making these depth adjustments while the implement is in motion. Notwithstanding such adjustments the spring at 15$^a$ acts uniformly to permit up and down movements, under pressure of the drag bars and their attachments.

With an automatically acting power driven lifting mechanism such as herein described, an extended plurality of the drill units can be employed. The length of the series of units is limited in machines requiring hand-lifting. But with a mechanism such as I have devised the machine can be extended laterally. Two lifters can be employed each being connected to one-half of the units; each unit comprising a drag bar, an opener and a seed delivering device. These units are not only independently movable vertically, within limits, but all units of a section have a common lifter, in the shaft 23, the arms 18 and the rods 15, by which they can be all simultaneously moved vertically. The path through which they will be moved by the wheel 29 and the link 28 will be varied in its position, vertically, in correspondence with the adjustments effected by the lever 65.

It will be understood, of course, that while I have shown and described my invention as embodied in a grain drill, it may also be applied to various other kinds of implements, and the claims are therefore to be construed accordingly.

What I claim is:

1. In a grain drill, the combination with the main frame, the ground wheel and the traction driven axle, of a plurality of drill units independently movable vertically, a lifter for moving all of the units vertically, means for actuating the lifter comprising a normally stationary drive wheel, means for optionally causing successive uni-directional half rotations of said drive wheel by the axle, a second wheel in constant engagement with and rotated by said drive wheel, power transmitting means actuated by the second wheel for moving the drill units vertically.

2. In a grain drill the combination with a frame, a ground wheel, a traction driven shaft, a plurality of drill units independently movable vertically, and a lifter for moving all of the drill units simultaneously vertically, of power actuated means for actuating the lifter comprising a normally stationary gear wheel mounted on said shaft, optionally controlled means actuated by said shaft for rotating said gear wheel through a predetermined part of a cycle, means for normally holding said gear wheel against rotation, a second gear wheel constantly engaging with and driven by the first gear wheel and vertically adjustable relatively thereto to vary the working position of the drill units, means operable to adjust said second gear vertically, and power transmitting means connecting the second gear wheel with said lifter for moving all of the drill units vertically.

3. In a grain drill, the combination with a main frame, a ground wheel and a traction driven axle, of a plurality of drill units independently movable vertically, a lifter for moving all of the units vertically, means for actuating the lifter comprising a normally stationary primary drive wheel, means actuated by the axle for optionally moving said primary wheel through a predetermined part of a cycle, a secondary wheel mounted to swing about said axle and constantly engaging with and rotated by the primary wheel, manually operated means for swinging said secondary wheel about said axle and for locking it in a fixed position, and power transmitting means actuated by the secondary wheel for moving the drill units vertically.

4. In a grain drill, the combination with a main frame, a ground wheel and a traction driven axle, of a plurality of drill units independently movable vertically, a lifter for moving all of the units vertically, means for actuating the lifter comprising a normally stationary primary drive wheel on the axle, means for optionally connecting said primary wheel to the axle for successive half revolutions, a casing mounted to swing about said primary wheel, a secondary wheel mounted in said casing and constantly engaging with and rotated by the primary wheel, means for swinging said casing, and means carried by said casing for holding said secondary wheel against reverse rotation.

5. In a grain drill the combination with a plurality of drill units and a traction driven power shaft, of gearing optionally actuated by said shaft through a predetermined part of a cycle, said gearing being operatively connected with the drill units so that they may be moved vertically by the rotation of said gearing, a casing enclosing said gearing mounted to swing co-axially with said shaft, and adjustable means for holding said casing in a fixed position.

6. In a grain drill the combination with a main frame, a ground wheel and a traction driven axle, of a plurality of drill units independently movable vertically, a lifter for moving all of the units vertically, and means for actuating the lifter comprising a normally stationary drive wheel, means for optionally causing the rotation of said drive wheel by the axle through a predetermined part of a cycle, a second wheel in constant engagement with and rotated in a constant direction by said drive wheel, power transmitting means actuated by the second wheel for moving the drill units vertically and means operable to move said second wheel vertically and coincidently shift the power transmitting means for depth adjustment.

7. In a grain drill the combination with a main frame, a ground wheel and a traction driven axle, of a plurality of drill units independently movable vertically, a lifter for moving all of the units vertically, and means for actuating the lifter comprising a normally stationary drive wheel, means for optionally causing the rotation of said drive wheel by the axle through a predetermined part of a cycle, a second wheel in constant engagement with and rotated in a constant direction by said drive wheel, power transmitting means actuated alternately in opposite directions by said second wheel on successive actuations thereof for moving the drill units vertically in either direction and means operable to move said second wheel vertically and coincidently shift the power transmitting means for depth adjustment.

8. In a grain drill the combination with a frame, a ground wheel, a traction driven shaft, a plurality of drill units independently movable vertically, and a lifter for moving all of the drill units simultaneously vertically, of power actuated means for actuating the lifter comprising a normally stationary gear wheel mounted on said shaft, optionally controlled means actuated by said shaft for rotating said gear wheel in a constant direction through a predetermined part of a cycle, a second gear wheel constantly engaging with and driven by the first gear wheel and vertically adjustable to vary the working position of the drill units, a vertically swinging support for said second gear wheel, means operable to swing said support vertically, and power transmitting means connecting the second gear wheel with said lifter and operating by successive actuations thereof to move all of the drill units vertically alternately in opposite directions.

9. In a grain drill the combination with a main frame, a ground wheel and a traction driven axle, of a plurality of drill units independently movable vertically, a lifter for moving all of the units, and means for actuating the lifter comprising a normally stationary primary drive wheel, means actuated by the axle for optionally moving said primary wheel through a predetermined part of a cycle, a second wheel mounted to swing about said axle and in constant engagement with and rotated by the primary wheel, a vertically swinging support for said second wheel manually operated means connected with said support and operable to swing said second wheel about said axle and to lock said support in a fixed position, and power transmitting means actuated by said second wheel and operating on successive actuations thereof to move the drill units vertically alternately in opposite directions.

10. In a grain drill the combination with a main frame, a ground wheel and a traction driven axle, of a plurality of drill units independently movable vertically, a lifter for moving all of the units vertically, and means for actuating the lifter comprising a normally stationary drive wheel on the axle, means for optionally connecting said drive wheel to the axle during a predetermined part of a cycle, a casing mounted to swing about the axis of said drive wheel, a second wheel mounted in said casing and in constant engagement with said drive wheel, means for swinging said casing vertically, power transmitting means actuated by said second wheel for moving the drill units vertically, and means carried by said casing for locking said second wheel against reverse rotation.

11. In a grain drill the combination with a plurality of drill units and a traction driven power shaft, of a clutch member connected to rotate with said shaft, a second clutch member loose on said shaft and adapted to operatively engage said first clutch member through a predetermined part of a cycle, a casing mounted on said shaft to swing vertically about said shaft as an axis, means supported by said casing at one side of said shaft and actuated by said second clutch member for lifting and lowering the drill units, means operable manually to swing said casing about the said shaft as an axis and means for separating said clutch members at the end of each cyclical movement.

12. In a grain drill the combination with a plurality of drill units and a traction driven power shaft, of a clutch member connected to rotate with said shaft, a second clutch member loose on said shaft and adapted to operatively engage said first clutch member through a predetermined part of a cycle, a casing mounted on said shaft to swing vertically about the same as an axis, a rotatable member, means supported by said casing and actuated by said second clutch member, a power transmitting connection between said rotatable member and the drill units for lifting or lowering the same, means operable manually to swing said casing about said shaft, and means for separating said clutch members at the end of each cyclical movement.

In testimony whereof, I affix my signature.

JOHN SCHAEFFER.

CERTIFICATE OF CORRECTION.

Patent No. 1,751,951.                                          Granted March 25, 1930, to

JOHN SCHAEFFER.

It is hereby certified that error appears in the printed specification of the above numbered patent requiring correction as follows: Page 4, line 127, claim 1, after the word "vertically" and before the period insert the words "in either direction, and means operable to move said second wheel vertically and coincidently shift the position of said power transmitting means for depth adjustment"; page 5, line 124, claim 9, after the word "units" insert the word "vertically"; and that the said Letters Patent should be read with these corrections therein that the same may conform to the record of the case in the Patent Office.

Signed and sealed this 22nd day of April, A. D. 1930.

(Seal)                                                                                 M. J. Moore,
                                                                                  Acting Commissioner of Patents.